United States Patent [19]

Teng et al.

[11] Patent Number: 5,753,145
[45] Date of Patent: *May 19, 1998

[54] POLARIZER FILMS WITH HIGH THERMAL AND HYGROSCOPIC STABILITY

[75] Inventors: Chia-Chi Teng, Piscataway; Hyun Nam Yoon, New Providence, both of N.J.; Mohammad Mortazavi, Sunnyvale, Calif.

[73] Assignee: Hoecst Celanese Corp., Somerville, N.J.

[*] Notice: The term of this patent shall not extend beyond the expiration date of Pat. No. 5,672,296.

[21] Appl. No.: 458,388

[22] Filed: Jun. 2, 1995

[51] Int. Cl.$^6$ .............................. F21V 9/14; C09K 19/00
[52] U.S. Cl. .................. 252/585; 252/299.01; 252/299.1
[58] Field of Search .................... 252/299.01, 299.1, 252/585

[56] References Cited

U.S. PATENT DOCUMENTS

| | | | |
|---|---|---|---|
| 4,631,328 | 12/1986 | Ringsdorf et al. | 252/299.1 |
| 4,824,882 | 4/1989 | Nakamura et al. | 524/89 |
| 4,840,640 | 6/1989 | Miura et al. | 8/506 |
| 4,842,781 | 6/1989 | Nishizawa et al. | 264/1.3 |
| 5,024,784 | 6/1991 | Eich et al. | 252/299.1 |
| 5,059,356 | 10/1991 | Nakamura et al. | 252/585 |
| 5,071,906 | 12/1991 | Tanaka et al. | 524/557 |
| 5,310,509 | 5/1994 | Okada et al. | 252/585 |
| 5,318,856 | 6/1994 | Misawa et al. | 428/524 |
| 5,340,504 | 8/1994 | Claussen | 252/585 |

FOREIGN PATENT DOCUMENTS

| | | | |
|---|---|---|---|
| 0 275 077 A1 | 7/1988 | European Pat. Off. | C09B 1/58 |
| 0 323 160 A3 | 7/1989 | European Pat. Off. | C08G 63/60 |
| 0 348 964 A3 | 1/1990 | European Pat. Off. | G02B 5/30 |
| 6228698 | 8/1988 | Japan . | |
| 63195602 | 8/1988 | Japan . | |

OTHER PUBLICATIONS

Patent Abstracts of Japan, vol. 12, No. 62 (P–670), 25 Feb. 1988 & JP,A62 20402 (Mitsubishi CHEM) & Database WPI, Week, 8741, Derwent Publications Ltd. London, GB; AN 87–289507, (1987).

Patent Abstracts of Japan, vol. 2, No. 477 (P–800), 14 Dec. 1988 & JP, A,63 195602 (Mitsubishi) & Database WPI, Week 8838, Derwent PUblications Ltd., London, GB; AN 88–267839, (1988).

*Primary Examiner*—Philip Tucker
*Attorney, Agent, or Firm*—Palaiyur S. Kalyanaraman

[57] ABSTRACT

This invention provides novel liquid crystalline polymers which, when blended with a suitable dye at a suitable high temperature and extruded, yields polarizer films with superior thermal and hygroscopic stability and polarizing efficiency. The invention further provides a process to prepare such polarizer films.

21 Claims, No Drawings

POLARIZER FILMS WITH HIGH THERMAL AND HYGROSCOPIC STABILITY

BACKGROUND OF THE INVENTION

Polarizers are important components of liquid crystal displays. Liquid crystal displays (LCDs) are widely used components in applications such as, for example, Notebook Personal Computers (PCs), calculators, watches, liquid crystal color TVs, word processors, automotive instrument panels, anti-glare glasses and the like. Typically, polarizers are used in the form of film, the polarizer film. In an LCD, the liquid crystal elements are generally sandwiched between two layers of polarizing films (also referred to as polarizer film herein) which regulate the incident light that enters the liquid crystal producing an on-and-off contrast.

The polarizing film comprises a polymeric film, a colorant and other optional layers collectively referred to as polarizing film. The polymeric film is traditionally a stretched polymer film such as, for example, polyvinyl alcohol (PVA). The colorant is usually iodine or a dichroic dye that is absorbed on the polymer film. This arrangement may then be coated or sandwiched on both sides with a substrate such as, for example, polyethylene terephthalate (PET), polymethyl methacrylate (PMMA), triacetyl cellulose (TAC), and the like. This may further be coated with an adhesive layer, protective layer, and the like.

The nature and quality of the polymeric substrate film influences the performance of the polarizing film. Traditional polymeric film materials such as stretched PVA are increasingly found to be inadequate in performance. Their limitations have become apparent with increasingly sophisticated applications for polarizer films and LCDs. More and more, the environment for use of these materials is becoming increasingly harsher in terms of temperature, humidity and the like. PVA films lack the needed heat and humidity resistance, strength, dependability, ease of use and ease of processing. Furthermore, they frequently suffer from deterioration of optical properties, such as a decrease in polarizing efficiency when exposed to high humidity/heat environment. Accordingly, improved polarizing films with high thermal and hygroscopic stability are urgently required to satisfy increasingly sophisticated applications.

Several attempts have been made to improve the performance of polarizer films with limited success. U.S. Pat. Nos. 5,310,509 and 5,340,504 disclose polarizing films based on water-soluble organic polymers such as polyvinyl alcohol and dichroic dyes. U.S. Pat. Nos. 4,824,882 and 5,059,356 disclose polyethylene terephthalate ("PET") films for polarizer applications. U.S. Pat. No. 5,318,856 discloses films of polyvinyl alcohol, polyvinyl formal, polyvinyl acetal and polyvinyl butyral. U.S. Pat. No. 4,842,781 discloses films of polyvinyls, polyester and polyamides. These polymers, however, still have the same disadvantages of PVA, especially in thermal and humidity resistance.

U.S. Pat. No. 5,071,906 discloses a polarizing film comprising a uniaxially stretched PVA having a degree of polymerization of about 2,500–10,000, and a colorant. While this is a slight improvement over traditional lower molecular weight PVA, it still suffers from the disadvantages of PVA.

Liquid crystal polymers are known to possess higher thermal stability than traditional thermoplastics. Furthermore, the process of extrusion or molding generally achieves high degree of orientation in liquid crystal polymers. For this reason, liquid crystal polymers would be ideal candidates for polarizer substrate film applications. In fact, some attempts have been made in the past to use such polymers for polarizer applications. For example, Japanese patent application JP 62-28698 (filed Feb. 10, 1987) discloses a polarizing film consisting of a thermotropic liquid crystal polyester film with a dichroic coloring matter dyed and oriented, wherein the polymer is a copolyester of a hydroquinone derivative (A), a terephthalic acid ingredient (B), an isophthalic acid ingredient (C) and a parahydroxybenzoic acid ingredient (D), with the molar ratio of A to D being in the range 5:95 to 70:30% and the molar ratio of B to C being in the range 50:50 to 100:0%. The disclosed polymer compositions are difficult or nearly impossible to make. Additionally, the monomer ratios disclosed for those polymers do not necessarily yield a balanced formula for preparing liquid crystalline polymeric compositions. Moreover, if even one could make such polymers, any films from such polymers are likely to be substantially deficient in optical transparency, which therefore would limit and/or prevent any potential utility as polarizing films, especially in stringent environments.

U.S. Pat. No. 4,840,640 discloses the use of "liquid crystalline polyethylene terephthalate-parahydroxybenzoic acid," formed by copolymerizing a polyethylene terephthalate component (A) with a parahydroxybenzoic acid component (B) with the A:B molar ratio being in the range 40:60 to 5:95. Optical properties, especially light transmittance are a concern with such compositions. Additionally, such compositions have to be first blended with a dichroic acid and then formed into a film through a die at a high shear rate to achieve satisfactory film orientation and light transmittance. This not only increases the processing steps, but also still yields films with inadequate performance.

Accordingly, it is an object of this invention to provide a polarizing film which has high thermal and hygroscopic stability and is useful for existing as well as sophisticated applications.

It is another object of this invention to provide a liquid crystal polymeric film useful for polarizer applications.

It is an additional object of this invention to provide liquid crystal polymer compositions that can be blended with suitable dyes and then formed into films useful for polarizer applications.

It is yet another object of this invention to provide liquid crystalline polymers which can form films with high orientation, optical transparency, moisture resistance and heat resistance with minimal processing needs, and which can be blended with organic dichroic dyes to be converted into polarizing films with high thermal and hygroscopic stability.

Other objects and advantages of the present invention shall become apparent from the accompanying description and examples.

SUMMARY OF THE INVENTION

One or more of the objects of the invention are achieved by the provision of an all-organic polarizing film, which film comprises a blend of (a) at least one film-forming, wholly aromatic thermotropic liquid crystalline polymer ("LCP"), and (b) at least one organic dichroic dye compatible with the polymer, wherein said polarizing film possesses an initial polarizing efficiency of at least 70%, and further wherein said polarizing film substantially retains its polarizing efficiency when exposed to at least 90° C. temperatures and 90% Relative Humidity ("R.H.") for a period of at least 100 hours. The term "compatible" refers to the fact that the dye and the polymer are suitable to be blended at a range of temperatures including and up to the melt of the polymer, and then to be extruded into an uniform film at temperatures up to and including the melt of the polymer to yield the polarizing film in which the dye molecules are uniformly distributed. The term "substantially retains its polarization efficiency" refers to the requirement that the initial polarization efficiency of the film does not drop off by more than 10% (of the initial polarizing efficiency) after the film is exposed to the above-noted temperature and humidity environment for the duration specified above. The preferred blending and processing of the polymer-dye combination is performed at temperatures above 170° C. or at, or near, the melt temperature of the polymer; therefore, both the polymer and the dye have to possess sufficiently high stability, with no chemical change, to those conditions.

The LCP is selected from the group consisting of polyester, polyamide, polyesteramide, polyketone, polycarbonate, polyurethane, polyether, polyvinyl and the like. A preferred LCP is a polyester or a polyesteramide. An illustrative liquid crystalline polymer useful in the practice of the invention comprises repeat units corresponding to the formula:

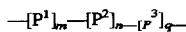

wherein $P^1$ is an aromatic hydroxy carboxylic acid or an aromatic amino carboxylic acid; $P^2$ is an aromatic dicarboxylic acid; $P^3$ is a phenolic compound; m, n and q represent mole percent of the respective monomers generally ranging from 0–70 mole percent individually, with m+n+q totalling 100 mole %. The preferred value of m is about 0–40%, n is about 0–40% and q is about 0–30%. In addition to $P^1$, $P^2$ and $P^3$, additional monomeric moieties such as, for example, a second aromatic hydroxy carboxylic acid or an amino carboxylic acid $—[P^4]_r—$, a diphenol moiety $—[P^5]_s$, and the like, may be part of the polymer repeat unit, in which case r is about 5–20 mole %, and s is about 5–20 mole %, with the total m+n+q+r+s being adjusted to be 100 mole %. $P^4$ is different from $P^1$ and $P^5$ is different from $P^3$. Suitable dichroic dyes include, but are not limited to, straight chain dyes, branched dyes, direct dyes, disperse dyes, acidic dyes and the like.

The invention further provides a process to make polymer-dye blends for polarizer film compositions.

DESCRIPTION OF THE PREFERRED EMBODIMENTS

In one embodiment, the present invention discloses an all-organic polarizing film with high thermal and humidity stability, and polarizing efficiency. The film may possess additional advantages such as high orientation, optical clarity and dichroic ratio. The term "high thermal and humidity stability" refers to no substantial change in optical properties of the polarizer film when the film is exposed to environmental conditions of at least about 90% humidity and temperatures of at least about 90° C. for at least about 100 hours. The term "high polarizing efficiency" refers to polarization efficiency of at least 70%.

The inventive polarizing film is obtained from a blend comprising (a) one or more film-forming, wholly aromatic thermotropic liquid crystalline polymers, and (b) one or more compatible organic dichroic dyes. The organic polymers and dyes suitable to practice the invention are as stated above. Among the polymers listed, liquid crystalline polyesters or polyesteramides are preferred. The preferred LCP compositions comprise the repeat units:

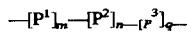

wherein $P^1$, $P^2$, and $P^3$ are as described above. Examples of $P^1$ include, but are not limited to, monomers such as 4-hydroxybenzoic acid, 2-hydroxy-6-naphthoic acid, 4-aminobenzoic acid, and 4-carboxy-4'-hydroxy-1,1'-biphenyl. Examples of $P^2$ include, but are not limited to, terephthalic acid, isophthalic acid, phthalic acid, 2-phenylterephthalic acid, 1,2-naphthalene dicarboxylic acid, 1,4-naphthalene dicarboxylic acid, 2,6-naphthalene dicarboxylic acid and 4,4'-biphenyldicarboxylic acid. Examples of $P^3$ include, but are not limited to, resorcinol, hydroquinone, methyl hydroquinone, phenyl hydroquinone, catechol, 4,4'-dihydroxybiphenyl, bisphenol A, and acetaminophen. Additional monomers such as a second hydroxycarboxylic acid or a second aminocarboxylic acid $—[P^4]_r—$, a diphenol moiety, $—[P^5]_s—$, and the like, may also be part of the polymeric repeat unit, with r and s being the respective molar quantities of the respective monomer, with $P^4$ being different from $P^1$, and $P^5$ being different from $P^3$. Examples of $P^4$ include, but are not limited to, 4-hydroxybenzoic acid, 2-hydroxy-6-naphthoic acid, 4-aminobenzoic acid, and 4-carboxy-4'-hydroxy-1,1'-biphenyl. Examples of $P^5$ include, but are not limited to, resorcinol, hydroquinone, methyl hydroquinone, phenyl hydroquinone, catechol, 4,4'-dihydroxybiphenyl, bisphenol A, and acetaminophen. The individual monomers $P^1$, $P^2$, $P^3$, $P^4$ and $P^5$ are present in amounts of 0–40, 0–40, 0–30, 5–20 and 5–20 mole percent respectively. The total molar amounts of m+n+q+r+s equals 100%. Still additional monomers such as, for example a third diphenol, or another dicarboxylic acid and the like, may also be present in the repeat unit in suitable amounts. In selecting the monomers and their respective quantities, care should be taken not to sacrifice the desired properties of the polymer. Suitable choice of monomers and their respective amounts leads to the polymers and thereon to polarizer films with desired thermal and hygroscopy stability and other properties.

The invention may be illustrated by a polarizer film prepared from a blend of (a) the LCP (hereinafter referred to as "COTBPR"), prepared from the monomers 4-hydroxybenzoic acid ("HBA") for $P^1$, 6-hydroxy-2-naphthoic acid ("HNA") for $P^2$, terephthalic acid ("TA") for $P^3$, 4,4'-biphenol ("BP") for $P^4$ and resorcinol ("R") for $P^5$ in its repeat unit in the ratio 30:30:20:10:10 respectively, and (b) a suitable organic dichroic dye. Preparation of COTBPR may be done by any known method. In a typical synthesis, the above-noted five monomers in their respective mole ratios were mixed in a suitable apparatus containing a suitable distillation head. The contents are kept in an inert atmosphere while a catalyst such as, for example, potassium acetate, and a solvent such as, for example, acetic anhydride are added to the ingredients and the mixture is heated and stirred in an oil bath. The temperature is raised high enough for acetic acid to distil over. After almost all acetic acid has been possibly removed, the apparatus is evacuated when polymer COTBPR forms as a polymer melt. As any remaining acetic acid distils over, the viscosity keeps increasing. The apparatus is then cooled to, for example, ambient temperature, when the desired COTBPR is isolated.

The polymer may be analytically characterized by measuring typical polymer properties such as inherent viscosity ("I.V."), melt viscosity ("MV"), as well as by other techniques such as differential scanning calorimetry ("DSC"), thermogravimetric analysis ("TGA"), NMR, IR and the like conventional methods well known to those skilled in the art. I.V. may be defined as:

$$I.V.=ln(\eta_{rel})/c$$

where c is the concentration of solution (0.1 wt %), and $\eta_{rel}$=relative viscosity. The relative viscosity may be measured by dividing the flow time in a capillary viscometer of the polymer solution by the flow time of the pure solvent. An important property is thermal stability. DSC gives a good indication of the glass transition temperature ($T_g$). The melt temperature $T_m$ is also determined by DSC and is defined as the peak of a melt endotherm shown in the DSC. Since the inventive LCP has to be processed at high temperatures, polymeric composition with high enough $T_g$ and $T_m$ (preferable no melt temperature) are preferred. Hot stage optical microscopy measures the liquid crystalline phase change and the anisotropy of the melt.

In a typical preparation of COTBPR with the above-noted molar ratios, the polymer had an I.V. of 2.0–2.4 dl/g as determined in a pentafluorophenol solution of 0.1 weight percent concentration at 60° C. and a MV of about 700–1, 700 poise at a shear rate of $10^3$ sec$^{-1}$ measured at 230° C. in a capillary rheometer using an orifice of 1 mm diameter and 30 mm length. The $T_g$ as measured by DSC (10° C./min heating rate) was about 106° C. and the solid-to-liquid crystalline transition ($T_{s \to lc}$) at about 170° C. with the polymer melt being optically anisotropic. No $T_m$ could be found, showing that the polymer COTBPR possesses exceptional thermal properties.

By varying the monomers $P^1$, $P^2$, $P^3$, $P^4$ and $P^5$, and their amounts in the polymerizations, several LCPs could be prepared, as described in the EXAMPLES section below.

An embodiment of the present invention includes all organic polarizing films made with inventive organic polymers, and dichroic dyes, and possessing high thermal and hygroscopic stability. The inventive polymers are blended with organic dichroic dyes, to produce a composition to form polarizing films therefrom. Suitable dichroic dyes include, but are not limited to, straight chain dyes, branched dyes, direct dyes, disperse dyes, acidic dyes and the like. Yellow, orange, blue, purple or red dyes are all suitable. Several classes of suitable dyes are well known to those skilled in the art. They include, but are not limited to azo dyes, anthraquinone dyes, commercially available Disperse dyes such as Blue 214, Red 60 and Yellow 56, direct dyes such as Black 17, 19 and 154, Brown 44, 106, 195, 210, 242 and 247, Blue 1, 15, 22, 78, 90, 98, 151, 168, 202, 236, 249, and 270, Violet 9, 12, 51, and 98, Green 1 and 85, Yellow 8, 12, 44, 86, and 87, Orange 26, 39, 106 and 107, and Methylene violet Bernthsen (available from Aldrich Chemical Company, Milwaukee, Wis.). More than one compatible dyes may also be used, if so desired. The choice of suitable dichroic dye or dyes depends on several factors, as is well known to those skilled in the art. Some such factors include, but are not limited to, light fastness and migration in the polymer. Another desirable property is that the transition moment of the dye and molecule main axes should have the same direction. Such factors form the "compatibility" requirement discussed earlier.

Polarizing films comprising the inventive polymer-dye combination may be formed any suitable method. For example, the polymer and dye may be physically blended together at ambient temperature and then converted into the film by a suitable method. A preferred method, however, is to blend a mixture of both the LCP composition and the dye at temperatures of at least 170° C. and upto about, or at, the melt temperature of the polymer and form the film also at such high temperatures. A still more preferred method, however, is to melt-blend a mixture of both the LCP composition and the dye (blending the two together at temperatures at, or near, the melting temperature of the polymer) prior to film formation into an extrudable mixture and then extrude the mixture at a suitable temperature, for example at the melt temperature of the polymer, into a film. This method takes advantage of the unique high thermal stability properties of the inventive polymer-dye combinations and yields a polarizer film wherein the dye is uniformly dispersed in the polymer film. Thus, for example, the above-described COTBPR and a suitable dye may be taken together in a suitable mixer and heated to a suitable temperature, in the general range 170°–300° C., and preferred range 170°–250° C., and blended thereat to form a well blended mixture. This mixture may be charged into a suitable melt extrusion apparatus, melted and the melt then extruded to yield a suitable dimension polarizer film. This process has the added advantage that film dimensions can be easily changed by changing the extrusion die accordingly. The choice of a suitable dye or dyes has relevance in this process of melt blending and extrusion. Since melt blending and extrusion are at fairly high temperatures, the dye and the polymer have to possess adequate thermal stability at such temperatures. The inventive polymers fit that requirement very well. If the polymer does not have a melt temperature, as many of the inventive polyesters are, the blending and extrusion may be done at as high a temperature as possible, limited perhaps only by the thermal characteristics of the dye.

Characterization of the inventive polarizer film may be performed by well known methods skilled in the art. Polarizer films prepared according to the present invention have high thermal and humidity resistance and polarizing efficiency (as measured by the polarizing coefficient). They also possess excellent optical characteristics such as light transmittance in the wavelength desired. The desired wavelength depends on the dye selected. In a typical experiment, for example, a COTBPR film prepared as described above was melt-blended with Methylene Violet Bernthsen dye at about 240° C. and the blend was then melt extruded at temperatures above 200° C. to form a polarizer film. Optical properties of this film, including the polarization coefficient, were measured according the procedure described in U.S. Pat. No. 5,071,906 cited above. The film had a blue color with transmittance of about 40% and an initial polarizing coefficient of about 93% in the wavelength region 550–630 nm.

The advantageous high thermal and hygroscopic stability of the inventive polarizer film was demonstrated as follows. The film was subjected to an environment of 100° C. and 95% Relative Humidity ("R.H.") for about 120 hours, and the polarizing coefficient was measured again. The polarizing coefficient stayed at about 92%, indicating virtually no change. For comparison, commercially available polarizer films based on both PVA and iodine, and PVA and a dichroic dye were tested under the same conditions. The polarizing coefficients of these comparative films dropped off either totally or substantially after exposure to the above-noted heat/humidity environment even though they started off with slightly higher initial polarization coefficients. This demonstrated the superior thermal/humidity resistance of the inventive polarizer films compared to conventional polarizer films.

In addition to offering polarizers with superior properties, the present invention allows one to tailor-make polarizer films to suit different wavelengths. This is done by appropriately selecting the dye or dyes. The preferred process is a melt extrusion; no solvents are generally needed. Because of this the dye incorporation and distribution are likely to be much more uniform than in the conventional solution-dipping process. Furthermore, the extrusion temperatures can be easily adjusted to suit different dyes and LCP compositions, depending upon their thermal stability. Thus the inventive process is much more versatile than the conventional methods of preparing polarizer films.

The following EXAMPLES are provided to further illustrate the present invention, but the invention is not to be construed as being limited thereto.

EXAMPLES

Example 1

Preparation of COTBPR:

This example illustrates the preparation of COTBPR polyester from a 1 mole reaction mixture of 4-hydroxybenzoic acid ("HBA"), 6-hydroxy-2-naphthoic acid ("HNA"), terephthalic acid ("TA"), 4,4'-biphenol ("BP"), and recorsinol ("R") in the ratio 30:30:20:10:10.

To a 500 ml 3-neck flask equipped with a half-moon shaped TEFLON® stirrer blade, gas inlet tube, thermocouple, a Vigreux column attached to a condenser and receiver were added the following:

a) 41.440 grams of 4-hydroxybenzoic acid (0.3 moles);

b) 56.456 grams of 6-hydroxy-2-naphthoic acid (0.3 moles);

c) 33.226 grams of terephthalic acid (0.2 moles);

d) 18.600 grams of 4,4-biphenol (0.1 moles);

e) 11.012 grams of resorcinol (0.1 moles);

the flask was immersed in an oil bath and provided with means to accurately control the temperature. The flask was thoroughly purged of oxygen by evacuation and then flushed with nitrogen three times, and slowly heated in the oil bath; and f) 0.02 grams of potassium acetate was added as a catalyst along with 105.48 grams of acetic anhydride (2.5% excess). Acetic acid began to distill over and was collected in a graduated cylinder.

The contents of the flask were heated while stirring at a rate of 2000 rpm to 200° C. over a period of 60 minutes at which time 10 ml of acetic acid had been collected. The reaction temperature was then gradually raised at a rate of about 1° C./min to 320° C. at which time 96 ml of acetic acid had been collected. The flask was heated at 320° C. for another 60 min. A total of 110.5 ml of acetic acid had been collected. The flask was then evacuated to a pressure of 1.0 mbar at 320° C. while stirring. During this period the polymer melt continued to increase in viscosity while the remaining acetic acid was removed from the flask. The flask and its contents were removed from the oil bath and were allowed to cool to the ambient temperature. Polymer was then removed from the flask and a total of 120 grams of polymer was obtained.

The resulting polyester had an inherent viscosity (IV) of 2.0–2.4 dl/g as determined in a pentafluorophenol solution of 0.1 percent by weight concentration at 60° C. and a melt viscosity (MV) of 700–1,700 poise at a shear rate of $10^3$ sec$^{-1}$ measured at 230° C. in a capillary rheometer using an orifice of 1 mm diameter and 30 mm length.

When the polymer was subjected to differential scanning calorimetry (10° C./min heating rate), it exhibited a glass transition temperature (Tg) of 106° C.; no melt endotherm could be detected. When the polymer was examined by hot-stage cross-polarized optical microscopy, it had a transition temperature from solid to liquid crystalline ($T_{s \to lc}$) at 170° C. The liquid crystalline phase was optically anisotropic.

Examples 2–14

Following the procedure outlined in Example 1, the following additional variants of the COTBPR composition were prepared having different proportions of the five ingredients noted above for COTBPR. Composition, glass transition temperature, melt temperature and I.V. for the compositions appear in Table I below. Unless otherwise indicated, properties were measured as in Example 1. Table II lists polymers (EXAMPLES 15–23) which are not variants of COTBPR since they include additional monomers ("X" in Table II) or exclude some monomers of COTBPR ("—" in Table II).

TABLE I

| Example | HBA:HNA:TA:BP:R | Tg °C. | Tm °C. | $T_{s \to lc}$ °C. | I.V. (dl/g) |
|---|---|---|---|---|---|
| 1 | 30:30:20:10:10 | 106 | none | 170 | 2.5 |
| 2 | 20:30:25:15:10 | 108 | none | 280 | 2.74 |
| 3 | 30:20:25:15:10 | 107 | none | 275 | 2.12 |
| 4 | 40:10:25:15:10 | 106 | none | 255 | 1.96 |
| 5 | 30:10:30:20:10 | 111 | none | 280, 385 | 2.64 |
| 6 | 20:20:30:20:10 | 108 | none | 350, 385 | 2.74 |
| 7 | 10:30:30:20:10 | 113 | none | 290, 400 | 2.48 |
| 8 | 20:30:25:10:15 | 113 | none | 160 | 2.10 |
| 9 | 20:30:25:5:20 | 122 | none | 163 | 1.76 |
| 10 | 35:35:15:10:5 | 107 | 179 | 135 | 4.14 |
| 11 | 30:40:15:10:5 | 107 | 190 | 145 | 3.30 |
| 12 | 20:40:20:15:5 | 109 | 226 | 125 | 3.34 |
| 13 | 30:30:20:15:5 | 109 | 233 | 155 | 2.68 |
| 14 | 20:30:25:20:5 | 112 | 301 | 250 | 3.93 |

TABLE II

| Example | HBA:HNA:TA:BP:R:X | X |
|---|---|---|
| 15 | 25:35:20:—:—:20 | Phenyl hydroquinone |
| 16 | 30:30:20:—:—:20 | Phenyl hydroquinone |
| 17 | 30:30:20:20:—:10 | Phenyl hydroquinone |
| 18 | 30:30:20:—:10:10 | Phenyl hydroquinone |
| 19 | 30:30:20:7:7:6 | Phenyl hydroquinone |
| 20 | 25:35:20:—:—:20 | Methyl hydroquinone |
| 21 | 30:30:20:10:—:10 | Methyl hydroquinone |
| 22 | 30:30:20:—:10:10 | Methyl hydroquinone |
| 23 | 30:30:20:5:10:5 | Acetaminophen |

Example 24

Preparation of Dye Blended COTBPR by Melt Blending:

60 grams of the COTBPR from Example 1 and 0.3 gram of Methylene Violet Bernthsen (from Aldrich Chemical Company, Milwaukee, Wis.) were charged into the mixing chamber of a Haake Mixer (Model No. 3042309, HBI System 90, from Haake Company, Paramus, N.J.). The mixing ball and its contents were heated to 240° C. over about 30 minutes and then the charge was blended at a rotational speed of 100 rpm for 15 minutes at the temperature. The mixture of polymer and dye was removed from the ball and allowed to cool to the ambient temperature.

Example 25

Extrusion of Film and Measurement of Polarizing Coefficient (Polarizing Efficiency):

20 grams of the dyed polyester from Example 24 was compacted into a rod of ⅜ inch diameter. The rod was charged into the melting section of a micro fiber spinning unit (designed internally by Hoechst Celanese Corporation, Summit, N.J.). The polymer was melted and fed at a rate of 0.56 g/minute into a melt chamber. A slit die was located at the end of the melt chamber through which the polymer melt was extruded. The dimensions of the slit were ¼ inch by 5 thousandths of an inch. The extruding film was taken up by a take-up roll. During the spinning, the heater temperature was maintained at 230° C., the melt chamber temperature at 230° C. and the die temperature 235° C. The take-up speed of the film was 5 m/minute. The melt drawdown ratio, defined as the ratio of the take-up speed to the exit speed of the extruding film at the die exit, was 9. The width of the tape was 0.2 inches and the thickness 0.5 thousandths of an inch.

The obtained polarizing film had a blue color, a transmittance of 40% and a polarizing coefficient of 93% for the light in the wavelength region 550–630 nm, as measured following the procedure detailed in U.S. Pat. No. 5,071,906 cited above.

Example 26
Measurement of Thermal and Hygroscopic Stability:

The polarizer film from Example 25 was allowed to stand in a temperature-humidity-controlled oven at 100° C. and 95% R.H. for 120 hours and the polarizing coefficient was determined again similarly. The polarizing coefficient was found to be 92%, showing little change.

For comparison, the polarizing coefficients of two commercially available polarizing films, one based on PVA film and iodine (NPF-G1220DV from Nitto Denko Corporation, Japan) and the other based on PVA and a dichroic dye (NPF-Q-12 from Nitto Denko Corporation), were similarly determined. The two commercial films initially had polarizing coefficients of 99.95% and 88% respectively. After being allowed to stand in a temperature-humidity-controlled oven at 100° C. and 95% R.H. for 120 hours, the films showed significantly lowered polarizing coefficients of 0% and 40%, respectively, demonstrating thereby that the polarizer films of the present invention underwent far less, almost negligible, degradation in their polarizing coefficient at 100° C. and 95% R.H., compared with conventional polarizing films, indicative of their exceptional thermal and hygroscopic stability.

What is claimed is:

1. An all organic polarizer film comprising a blend of (a) at least one film-forming, wholly aromatic thermotropic liquid crystalline polyester and (b) at least one organic dichroic dye, and possessing an initial polarizing efficiency of at least 70%, wherein the polarizer film retains at least 90% of its initial polarizing efficiency when exposed to at least 90° C. temperatures and at least 90% Relative Humidity for a period of at least 100 hours, further wherein said polyester comprises repeat units corresponding to the formula:

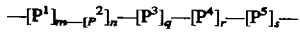

$$-[P^1]_m-[P^2]_n-[P^3]_q-[P^4]_r-[P^5]_s-$$

wherein $P^1$, $P^2$, $P^3$, $P^4$ and $P^5$ represent monomeric moieties with $P^1$ being an aromatic hydroxy carboxylic acid, $P^2$ being an aromatic dicarboxylic acid, $P^3$ being a phenol, $P^4$ being a second aromatic hydroxy carboxylic acid moiety different from $P^1$, and $P^5$ being a second phenolic moiety different from $P^3$, with m, n and q representing mole percent of the respective monomers ranging from 5–70 mole percent individually, and with r and s representing mole percent of the respective monomers respectively, r and s being 5–20 mole %.

2. The polarizer film of claim 1, wherein $P^1$ is selected from the group consisting of 4-hydroxybenzoic acid, 2-hydroxy-6-naphthoic acid, and 4-carboxy-4'-hydroxy-1,1'-biphenyl.

3. The polarizer film of claim 1, wherein $P^2$ is selected from the group consisting of terephthalic acid, isophthalic acid, phthalic acid, 2-phenylterephthalic acid, 1,2-naphthalenedicarboxylic acid, 1,4-naphthalenedicarboxylic acid, 2,6-naphthalene dicarboxylic acid and 4,4'-biphenyldicarboxylic acid.

4. The polarizer film of claim 1, wherein $P^3$ is selected from the group consisting of resorcinol, hydroquinone, catechol, 4,4'-dihydroxybiphenyl, 1,4-dihydroxynaphthalene, 2,6-dihydroxynaphthalene and acetaminophen.

5. The polarizer film of claim 1, wherein $P^4$ is selected from the group consisting of 4-hydroxybenzoic acid, 2-hydroxy-6-naphthoic acid, and 4-carboxy-4'-hydroxy-1,1'-biphenyl.

6. The polarizer film of claim 1, wherein said $P^5$ is a diphenol selected from resorcinol, hydroquinone, methyl hydroquinone, phenyl hydroquinone, catechol, 4,4'-dihydroxybiphenyl, bisphenol A, and acetaminophen.

7. The polarizer film of claim 2, wherein $P^1$ is 4-hydroxybenzoic acid.

8. The polarizer film of claim 2, wherein $P^1$ is 2-hydroxy-6-naphthoic acid.

9. The polarizer film of claim 3, wherein $P^2$ is terephthalic acid.

10. The polarizer film of claim 4, wherein $P^3$ is resorcinol.

11. The polarizer film of claim 4, wherein $P^3$ is 4,4'-dihydroxybiphenyl.

12. The polarizer film of claim 5, wherein $P^5$ is resorcinol.

13. The polarizer film of claim 1, wherein said dye is selected from the group consisting of straight chain dye, branched dye, direct dye, disperse dye, solvent dye and acidic dye.

14. The polarizer film of claim 1, wherein said dye is selected from the group consisting of azo dyes, anthraquinone dyes, Disperse Red, Blue 214, Red 60 and Yellow 56, Black 17, 19 and 154, Brown 44, 106, 195, 210, 242 and 247, Blue 1, 15, 22, 78, 90, 98, 151, 168, 202, 236, 249, and 270, Violet 9, 12, 51, and 98, Green 1 and 85, Yellow 8, 12, 44, 86, and 87, Orange 26, 39, 106 and 107, and Methylene violet Bernthsen.

15. The polarizer film of claim 14, wherein said dye is an anthraquinone dye.

16. The polarizer film of claim 1, wherein said blend is formed from said liquid crystalline polymer and said dye at about 170° C.

17. The polarizer film of claim 1, wherein said blend is formed from said liquid crystalline polymer and said dye at about the melt temperature of said polymer.

18. The polarizer film of claim 17, wherein said blend is further extruded at about the melt temperature of said liquid crystalline polymer to form the polarizing film.

19. An all organic polarizer film with high thermal and hygroscopic stability, comprising a blend of (a) a thermotropic liquid crystal polymer which comprises 4-hydroxybenzoic acid, 6-hydroxy-2-naphthoic acid, terephthalic acid, 4,4'-dihydroxybiphenyl and resorcinol in a molar ratio 30:30:20:10:10 respectively, and (b) an organic dichroic dye, and possessing an initial polarizing efficiency of at least 70%, wherein the polarizer film retains at least 90% of its initial polarizing efficiency when exposed to at least 90° C. temperatures and at least 90% Relative Humidity for a period of at least 100 hours.

20. An all organic polarizer film comprising a blend of (a) at least one film-forming, wholly aromatic thermotropic liquid crystalline polyesteramide and (b) at least one organic dichroic dye, and possessing an initial polarizing efficiency of at least 70%, wherein the polarizer film retains at least 90% of its initial polarizing efficiency when exposed to at least 90C. temperatures and at least 90% Relative Humidity for a period of at least 100 hours, further wherein said polyesteramide comprises repeat units corresponding to the formula:

$$-[P^1]_m-[P^2]_n-[P^3]_q-[P^4]_r-[P^5]_s-$$

wherein $P^1$, $P^2$, $P^3$, $P^4$ and $P^5$ represent monomeric moieties with $P^1$ being an aromatic amino carboxylic acid, $P^2$ being an aromatic dicarboxylic acid, $P^3$ being a phenol, $P^4$ being an aromatic hydroxy carboxylic acid, and $P^5$ being a second phenolic moiety different from $P^3$, with m, n and q representing mole percent of the respective monomers ranging from 5–70 mole percent individually, and with r and s representing mole percent of the respective monomers, r and s being 5–20 mole %.

21. The polarizer film of claim 20, wherein $P^1$ is 4-aminobenzoic acid.

* * * * *